United States Patent [19]
Mayer et al.

[11] Patent Number: 5,793,516
[45] Date of Patent: Aug. 11, 1998

[54] OPTICAL MODULATOR CIRCUIT

[75] Inventors: Hans-Peter Mayer, Korntal; Dieter Baums, Ludwigsburg, both of Germany

[73] Assignee: Alcatel N.V., Rijswijk, Netherlands

[21] Appl. No.: 568,938

[22] Filed: Dec. 7, 1995

[30] Foreign Application Priority Data

Dec. 8, 1994 [DE] Germany .............. 44 43 630.0

[51] Int. Cl.$^6$ .................. G02F 1/03; H03F 3/26
[52] U.S. Cl. .................. 359/245; 385/2; 330/55
[58] Field of Search .................. 359/180, 188, 359/245, 264, 276, 279; 385/2; 330/55

[56] References Cited

U.S. PATENT DOCUMENTS

| | | | |
|---|---|---|---|
| 3,661,443 | 5/1972 | Harris et al. | 359/245 |
| 5,373,384 | 12/1994 | Hebert | 359/161 |
| 5,477,367 | 12/1995 | van der Heijden | 359/180 |
| 5,488,503 | 1/1996 | Schaffner et al. | 359/245 |

OTHER PUBLICATIONS

Patent Abstracts of Japan, vol. 018, No. 464 (E–1598) 29 Aug. 1994 & JP–A–06 152206 (Toshiba Corp) 31 May 1994.

Journal of Lightwave Technology, Bd. 10, Nr. 1, Jan. 1992, New York US, pp. 71–77, XP000273022 "Chirping characteristic and frequency response of MQW optical intensity modulator".

Patent Abstracts of Japan, vol. 014, No. 178 (E–0915) 10 Apr. 1990 & JP–A–02 030201 (Fujitsu Ltd) 31 Jan. 1990.

Patent Abstracts of Japan, vol. 005, No. 153 (E–076) 26 Sep. 1981 & JP–A–a56 084017 (Mitsubishi Electric Corp.).

"A 10–Gb/s Optical Transmitter Module with a Monolithically Integrated Electroabsorption Modulator with a Laser" by Hironishi et al. IEE Photonics TGechnology Letters, vol. 2, No. 12, Dec. 1990, pp. 896–898.

*Primary Examiner*—Mark Hellner
*Attorney, Agent, or Firm*—Milton Oliver; Ware, Fressola, Van Der Sluys & Adolphson LLP

[57] ABSTRACT

A circuit arrangement is presented for an optical modulator with an optical modulator diode (MD) driven in the blocking direction which, in addition to a shunt resistor (RN) wired in parallel with the modulator diode, contains a damping resistor (RD) wired ahead of the modulator diode, for attenuating unwanted reflections. The damping resistor is preferably wired ahead of the parallel circuit of modulator diode and shunt resistor, and forms part of the terminal resistance of the connecting line carrying the modulation signal ($U_m$).

17 Claims, 2 Drawing Sheets

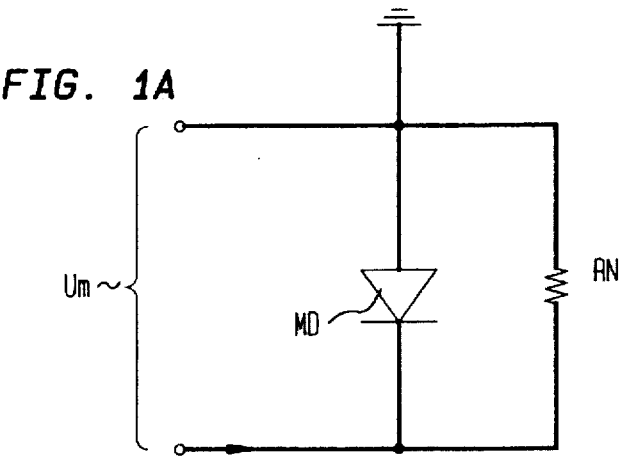
FIG. 1A
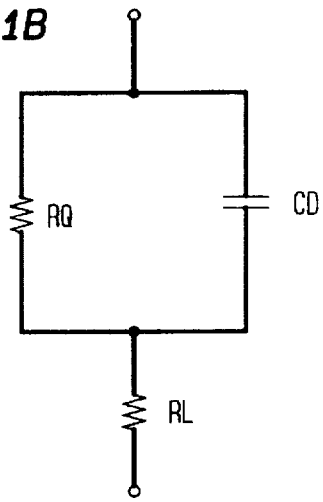
FIG. 1B
FIG. 2
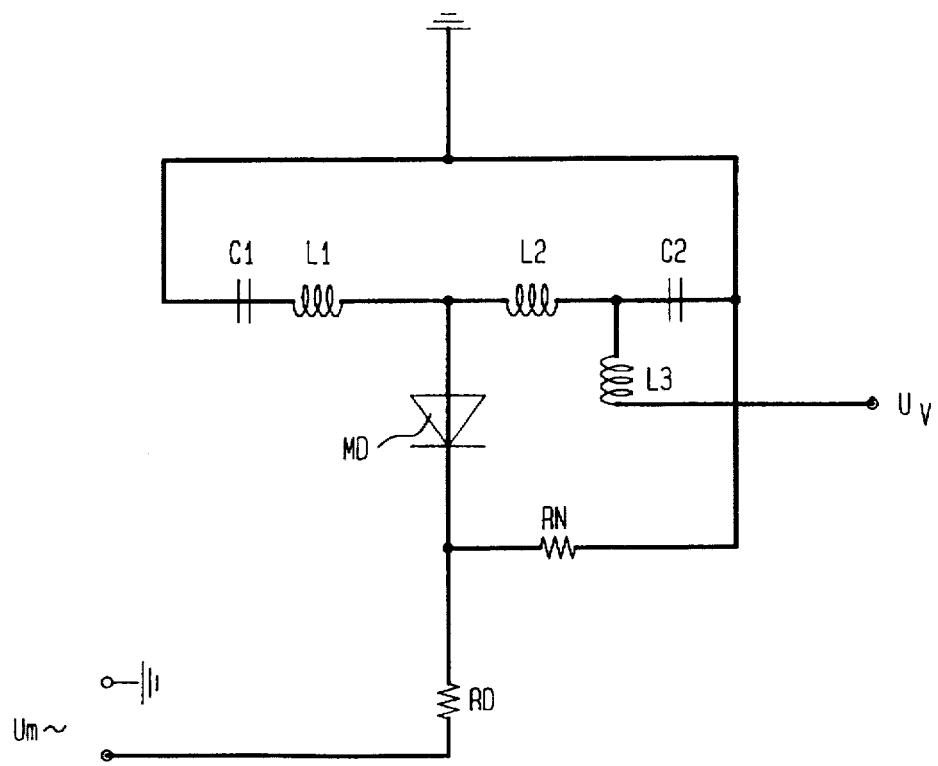

OPTICAL MODULATOR CIRCUIT

TECHNICAL FIELD

The invention concerns a circuit arrangement for an optical modulator comprising a reverse-biased optical modulator diode which is traversed by light to be modulated and which has a shunt resistor connected in parallel therewith to obtain an impedance match to a circuit supplying the modulating signal.

BACKGROUND OF THE INVENTION

So-called external optical modulators, which are often inserted into an optical waveguide immediately behind a light source, e.g. a laser, are able to modulate light with even much higher frequencies than is possible with directly modulated lasers or the like. For example, see the essay of M. Goto et al in IEEE Photonics Technology Letters, Vol. 2, No. 12, December 1990, pages 896 to 898.

When these modulators, which are constructed as modulator diodes, are electrically controlled by means of high-frequency electrical signals, care must be taken that the drive current circuit, which is conducted from the signal source to the electrodes of the modulator diode, is terminated at its characteristic wave impedance. The latter is achieved by connecting a shunt resistor in parallel with the modulator diode.

Particularly at frequencies>10 GHz, reflections of high-frequency signals still take place. This is attributed to the parasitic capacitance of the diode, which interacts with inductive resistances in the wiring of the diode.

SUMMARY OF THE INVENTION

The invention has the task of impeding such reflections as much as possible, thereby bringing about an increase in the modulation frequency and an improvement in the respective optical transmission channel with respect to its transmission capacity.

This task is fulfilled by a circuit arrangement that uses a damping resistor in series with the modulator diode so as to attenuate the reflections, without significantly disturbing the electric adaptation of the supply line. If the damping resistor is placed in series with a parallel circuit comprising diode and shunt resistor, then the damping resistor and the shunt resistor can be designed so that the sum of their values produces an optimum terminal resistance for the power circuit that delivers the modulator signal.

The circuit arrangement can include an additional inductance and coupling capacitance in series with the modulator diode, which are located between the modulator diode and the ground, to perform a filtering function.

Furthermore, the circuit arrangement can have a bias voltage provided between diode and coupling capacitance so as to keep the ground-oriented connection of the diode to the specified potential.

In addition, the circuit arrangement provides for dividing the series circuit of the inductance and coupling capacitance into two parallel connected LC elements, which permits building a mostly symmetrical circuit.

The circuit arrangement discloses that the partial inductances of the LC elements can be formed by bonding wires of suitable lengths and diameters.

The circuit arrangement of the invention can be fabricated on a substrate.

The circuit arrangement of the invention can be used as an optical switch.

BRIEF DESCRIPTION OF THE DRAWINGS

A configuration example of the circuit arrangement of the invention will now be described in detail by means of the figures, where:

FIG. 1a illustrates a circuit according to the state of the art.

FIG. 1b illustrates the equivalent circuit for the circuit shown in FIG. 1a.

FIG. 2 illustrates an electrical circuit diagram according to the invention.

BEST MODE FOR CARRYING OUT THE INVENTION

Figure 3:
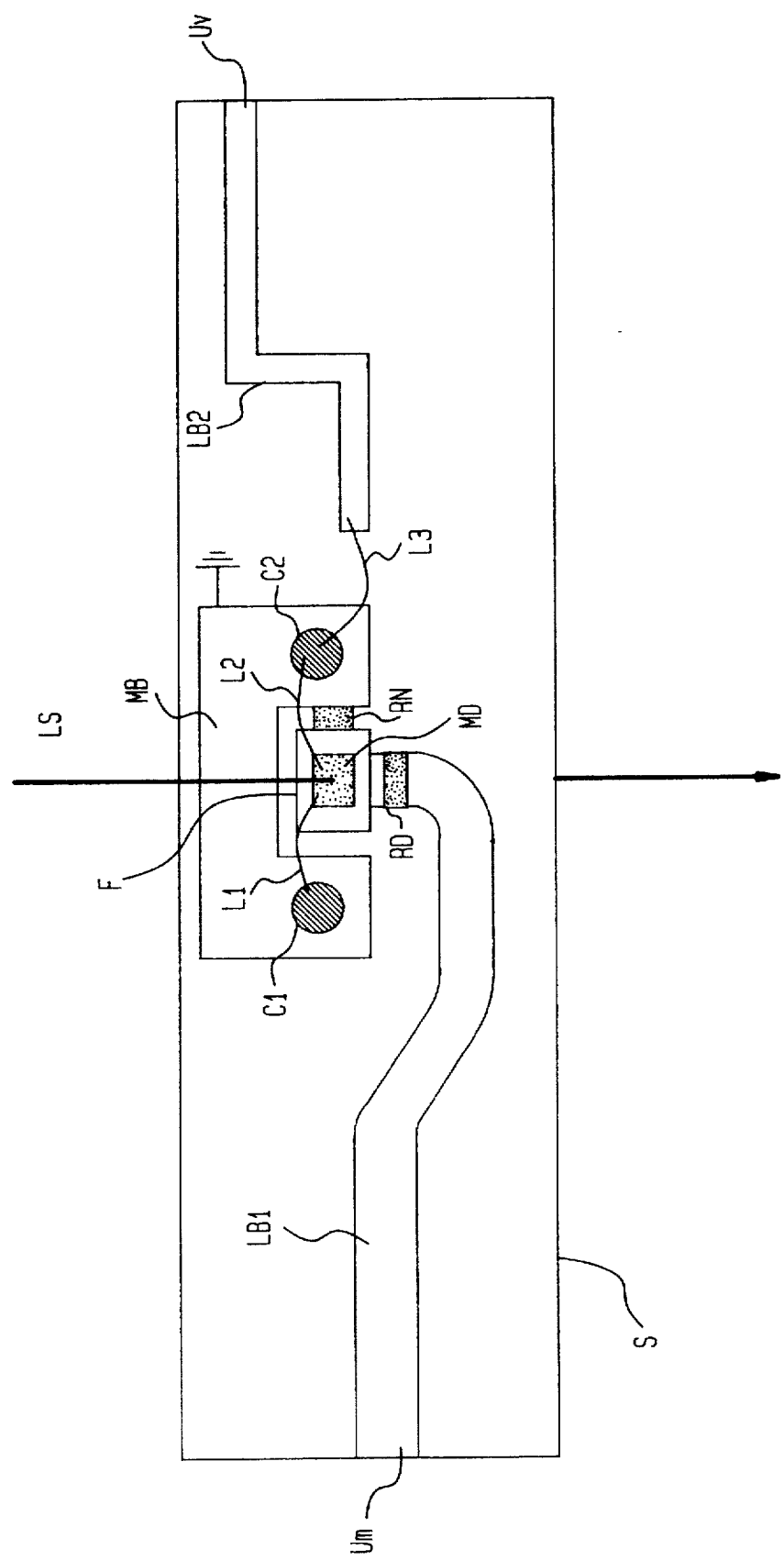
FIG. 3 illustrates the electrical-mechanical form of the circuit arrangement according to the invention on a substrate.

FIG. 1a illustrates a modulator diode MD with a shunt resistor RN, which terminates a drive current circuit producing a high-frequency signal voltage $U_m$, at its characteristic wave impedance. As a rule, one side of the drive current circuit, and thereby one electrode of the modulator diode, are grounded.

FIG. 1b depicts an equivalent circuit of the modulator diode for operation in the blocking direction. It contains a reverse resistance diode RQ, a diode capacitor CD and a series resistance RL. The reverse resistance diode is on the order of 1 MΩ, the diode capacitor is about 0.1 to 0.4 pF and the series resistance, which precedes the diode capacitor pair and thus also affects high-frequency alternating currents, has a value between 1 Ω and 10 Ω.

In FIG. 2, the modulator diode MD has additional connections according to the present invention. In addition to a shunt resistor RN, there is a damping resistor RD which in this case precedes the parallel connection of modulator diode MD and shunt resistor RN, but can also immediately precede the modulator diode, and there are two LC elements connected between the modulator diode and ground, each comprising an inductance L1, L2 and a coupling capacitor C1, C2. Instead of two LC elements, only one with a correspondingly lower inductance and higher capacitance could be used, but in this case the division into two partial circuits allows a symmetrical arrangement of the components on a substrate, as illustrated in FIG. 2. A third inductance L3 serves to connect a bias voltage $U_v$ to the coupling capacitors and to the modulator diode's electrode connected thereto.

In this case the damping resistor RD attenuates reflected high-frequency oscillations, and in addition forms part of the terminal resistance of the drive current circuit. The value of the terminal resistance is composed of the values of the damping resistor RD and the shunt resistor RN.

FIG. 3 illustrates the structure of the modulator circuit according to the invention. A metallized area MB is located on a substrate S, which e.g. can be made of AlN, and is connected and grounded through the also metallized bottom side of the substrate via not illustrated electrical wires. The metallized area surrounds in horseshoe fashion an optical modulator diode, whose underside is e.g. soldered to a separate metal surface F, and through which diode a laser beam to be modulated passes.

The underside of the modulator diode, which in this case is its simultaneous connection on the cathode side, is connected e.g. to a conductive path LB1 and to metallized area MB through resistors RD and RN produced with thin-film technology. As in FIG. 2, resistor RD is the damping resistor and resistor RN is the shunt resistor. In this case the modulation voltage $U_m$ is supplied through the conductive path LB1. The thickness of the substrate and the width of this conductive path are so coordinated with each other, that the desired complex line resistance between the conductive path and the metallized bottom side of the substrate lies in the operating frequency range.

The anode of the modulator diode, which is accessible from above in FIG. 3, is connected by bonding wires to the coupling capacitors C1 and C2. The bonding wires are attached to the top side of the coupling capacitors and form inductances L1 and L2 which, together with the respectively assigned coupling capacitor, form LC elements that serve to separate the direct and the alternating voltage portions.

The bottom side of the coupling capacitors forming the respective mating connectors of the capacitors, are e.g. attached to the metallized area MB, and thereby to ground as well, by an electrically conductive adhesive on both sides of the modulator diode.

The connection of bias voltage $U_v$ takes place through a second conductive path LB2 and a bonding wire connection to the top side of one of the coupling capacitors C2. This bonding wire also forms an inductance, which causes the decoupling of the second conductive path and the bias voltage source from the parts of the circuit that carry the high frequency modulation signal.

What is claimed is:

1. A circuit arrangement for an optical modulator, comprising
    a reverse-biased optical modulator diode (MD) which is traversed by light to be modulated and has a shunt resistor (RN) connected in parallel with said modulator diode (MD) to obtain an impedance match to a circuit supplying a modulating signal ($U_m$) to said modulator diode, and
    a damping resistor (RD) preceding the parallel combination of said modulator diode (MD) and shunt resistor (RN) and serving to attenuate reflection of high frequency components of said modulating signal.

2. A circuit arrangement as claimed in claim 1, comprising a damping resistor (RD) preceding the parallel combination of optical modulator diode (MD) and shunt resistor (RN), characterized in that the values of the damping resistor and the shunt resistor are chosen so that their sum represents an optimum value of a terminating resistance for the circuit supplying the modulating signal ($U_m$).

3. A circuit arrangement as claimed in claim 2, characterized in that an inductance and a coupling capacitance are connected in series with the modulator diode (MD) and form a grounded LC section.

4. A circuit arrangement as claimed in claim 3, characterized in that a terminal for applying a bias voltage ($U_v$) is provided between the modulator diode and the coupling capacitance.

5. A circuit arrangement as claimed in claim 4, characterized in that the inductance and the coupling capacitance are each divided into two parallel components (L1, L2; C1, C2) which are interconnected to form two parallel LC sections (L1, C1; L2, C2) arranged symmetrically with respect to the modulator diode (MD).

6. A circuit arrangement as claimed in claim 5, characterized in that the inductances (L1, L2) are provided by bonding wires.

7. A circuit arrangement as claimed in claim 6, characterized in that the modulator diode is disposed on the top side of a substrate (S) in a recess of a metallized area (MB), that the bottom side of the substrate is completely metallized and, like the metallized area on the top side of the substrate, electrically connected to ground, and that the electric lead to the modulator diode is designed as a conductive metal strip (LB1) which extends on the substrate surface and, together with the metal layer on the bottom side of the substrate, forms a 50 Ω line.

8. A circuit arrangement as claimed in claim 7, characterized in that the shunt resistor (RN) and the damping resistor (RD) are implemented in thin-film technology, and that through the shunt resistor (RN) and the damping resistor (RD), a further metallized area (F) supporting the modulator diode and connected to the anode of the latter is connected to the metallized area (MB) and the conductive strip (LB1), respectively.

9. A circuit arrangement as claimed in claim 8, characterized in that the coupling capacitances (C1, C2) are provided by coupling capacitors which are attached to the surface of the metallized area (MB) on both sides of the modulator diode by electrically conductive adhesive, and that at the points where the coupling capacitors are located, the metallized area is electrically connected to the bottom side of the substrate via plated-through holes.

10. A circuit arrangement as claimed in claim 9, characterized in that the substrate (S) is made of aluminum nitride, and that the metallized areas and conductive strips are made of gold.

11. The use of a circuit arrangement as defined in claim 1, as an optical switch.

12. A circuit arrangement for an optical modulator, comprising
    a reverse-biased optical modulator diode (MD) which is traversed by light to be modulated and has a shunt resistor (RN) connected in parallel with said modulator diode (MD) to obtain an impedance match to a circuit supplying a modulating signal ($U_m$) to said modulator diode, and
    a damping resistor (RD) preceding the modulator diode (MD) and serving to attenuate reflection of high frequency components of said modulating signal.

13. A circuit arrangement as claimed in claim 12, comprising a damping resistor (RD) preceding the parallel combination of optical modulator diode (MD) and shunt resistor (RN), characterized in that the values of the damping resistor and the shunt resistor are chosen so that their sum represents an optimum value of a terminating resistance for the circuit supplying the modulating signal ($U_m$).

14. A circuit arrangement as claimed in claim 12, characterized in that an inductance and a coupling capacitance are connected in series with the modulator diode (MD) and form a grounded LC section.

15. A circuit arrangement for an optical modulator, comprising
    a reverse-biased optical modulator diode (MD) which is traversed by light to be modulated and has a shunt resistor (RN) connected in parallel with said modulator diode (MD) to obtain an impedance match to a circuit supplying a modulating signal ($U_m$) to said modulator diode, and
    a damping resistor (RD) preceding the parallel combination of said modulator diode (MD) and shunt resistor (RN) and serving to attenuate reflection of high frequency components of said modulating signal, thereby permitting an increase in a maximum frequency of said modulating signal.

16. A circuit arrangement as claimed in claim 15, comprising a damping resistor (RD) preceding the parallel combination of optical modulator diode (MD) and shunt resistor (RN), characterized in that the values of the damping resistor and the shunt resistor are chosen so that their sum represents an optimum value of a terminating resistance for the circuit supplying the modulating signal ($U_m$).

17. A circuit arrangement as claimed in claim 15, characterized in that an inductance and a coupling capacitance are connected in series with the modulator diode (MD) and form a grounded LC section.

* * * * *